United States Patent [19]
Brokaw

[11] 3,826,340
[45] July 30, 1974

[54] VIBRATION DAMPER FOR SLENDER VERTICAL STRUCTURES

[76] Inventor: Hal R. Brokaw, 2052 Galveston, San Diego, Calif. 92110

[22] Filed: Sept. 19, 1973

[21] Appl. No.: 398,891

[52] U.S. Cl................. 188/1 B, 52/1, 174/42, 343/900, 343/904, 343/DIG. 1
[51] Int. Cl................. F16f 7/10, H01q 1/00
[58] Field of Search.......... 174/42; 52/1, 173; 188/1 B; 267/136, 141; 343/720, 874, 875, 890, 899, 900, 904, DIG. 1; 248/24, 188.9, 358 R

[56] References Cited
UNITED STATES PATENTS

| | | | |
|---|---|---|---|
| 98,926 | 1/1870 | Coogan | 248/188.9 |
| 2,714,161 | 7/1955 | Featherstun | 174/42 UX |
| 3,188,644 | 6/1965 | Sielaff | 174/420 UX |
| 3,210,765 | 10/1965 | Jones | 174/42 X |
| 3,568,805 | 3/1971 | Reed | 188/1 B |

FOREIGN PATENTS OR APPLICATIONS

| | | | |
|---|---|---|---|
| 1,439,190 | 4/1966 | France | 248/188.9 |
| 13,867 | 10/1887 | Great Britain | 248/188.9 |

Primary Examiner—Laramie E. Askin

[57] ABSTRACT

A damper for detuning a vertical slender structure such as a monopole antenna, subject to wind induced vibrations, the damper having a "mushroom" shaped configuration with a cap mounted on one end of a flexible stem, the other end of the stem secured to the top of the structure enabling the cap to oscillate out-of-phase with the vibrating structure.

3 Claims, 2 Drawing Figures

PATENTED JUL 30 1974  3,826,340

VIBRATION DAMPER FOR SLENDER VERTICAL STRUCTURES

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to a vibration damper designed primarily for a slender vertical structure, such as a monopole antenna, but it is understood that it can be used for any purposes for which it is found applicable.

Various techniques have been proposed to dampen the vibration of antennas, masts, towers, and the like which are supported at their base and have an upper end free to vibrate usually induced by wind conditions. The greatest stress occurs at the base of such structures where they are supported.

Prior art dampers for the most part employed a viscous liquid means in which is immersed a pendulum. U.S. Pat. No's 3,382,629, 3,245,177 and 3,310,138 are representative of such devices. Another prior art technique to dampen vibration in monopole antennas consists of hanging a plurality of heavy chains within the antenna suspended from the top.

Such techniques present several disadvantages. They usually require extensive modifications of an existing structure, usually at the upper end. These brute force techniques also amount to an appreciable addition of weight to the top of the antenna which presents a serious problem during earthquakes or violent wind gusts in that they interfere with the free movement of the upper end. In addition to the high costs, such complicated devices require an excessive amount of maintenance, and at an awkward location on top of the antenna not readily accessible.

SUMMARY OF THE INVENTION

The "mushroom" configured vibration damper provides a simple and inexpensive device for detuning slender vertical base-supported structures, such as monopole antennas. It has been found that because of wind induced vibrations the high band monopole antennas in the Wullenweber receiver array have suffered structural damage at the base portion where the larger aluminum sleeve is welded to the bolting ring for attachment to the usual concrete ground pad.

A substantial attenuation of the vibration of such structures has been achieved by mounting the novel damper on the top of such structures. The damper is constructed of an enlarged disk-like cap portion secured to one end of a flexible vertical stem portion. The bottom of the stem is fastened, preferably by a suitable adhesive, directly to the top of the structure to be dampened, thus eliminating the need for any modification to the existing structure. Vibration at the top of the structure causes the cap to oscillate, swaying back and forth on the flexible stem, in an out-of-phase relation with the antenna top, substantially cancelling out the vibration throughout the length of the antenna. The damper stem may be of tubular construction to enhance its flexibility and to receive an attaching projection on the cap.

For the high band monopole antenna used in the Wullenweber array, the cap portion and stem portion can be made of non-metallic material, such as rubber, to avoid interference with the electromagnetic field.

STATEMENT OF THE OBJECTS

A principal object of this invention is to provide a damper which will effectively dampen by detuning the vibrations of a vertical slender structure.

Another important object is to provide such a damper which is light-weight so as to not interfere with the free movement of the upper end of the structure in the event of a wind gust or earthquake.

Still another principal object is to provide such a damper which is simple; inexpensive to construct and to install; which has no articulated or other moving parts that require maintenance; and which can be installed on top of the structure without requiring any modification of the structure such as by use of an adhesive, or rubber cap or the like.

Other objects, advantages and novel features of the invention will become apparent from the following detailed description of the invention when considered in conjunction with the accompanying drawings.

DESCRIPTION OF THE PREFERRED EMBODIMENT

Figure 2:
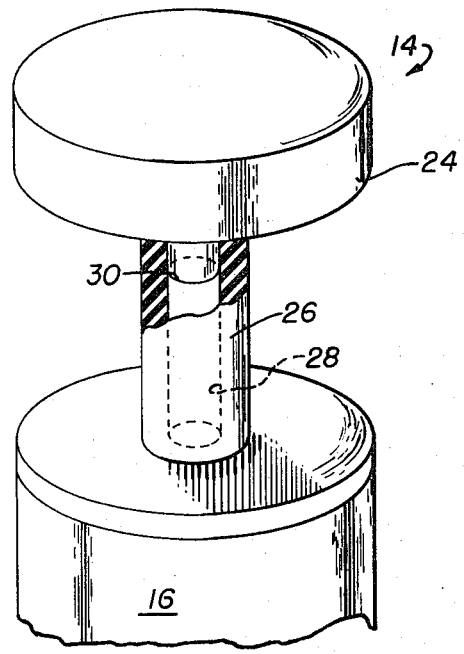
FIG. 2 is an enlarged perspective of the novel vibration damper, partially cut away to show some of the details.
Figure 1:
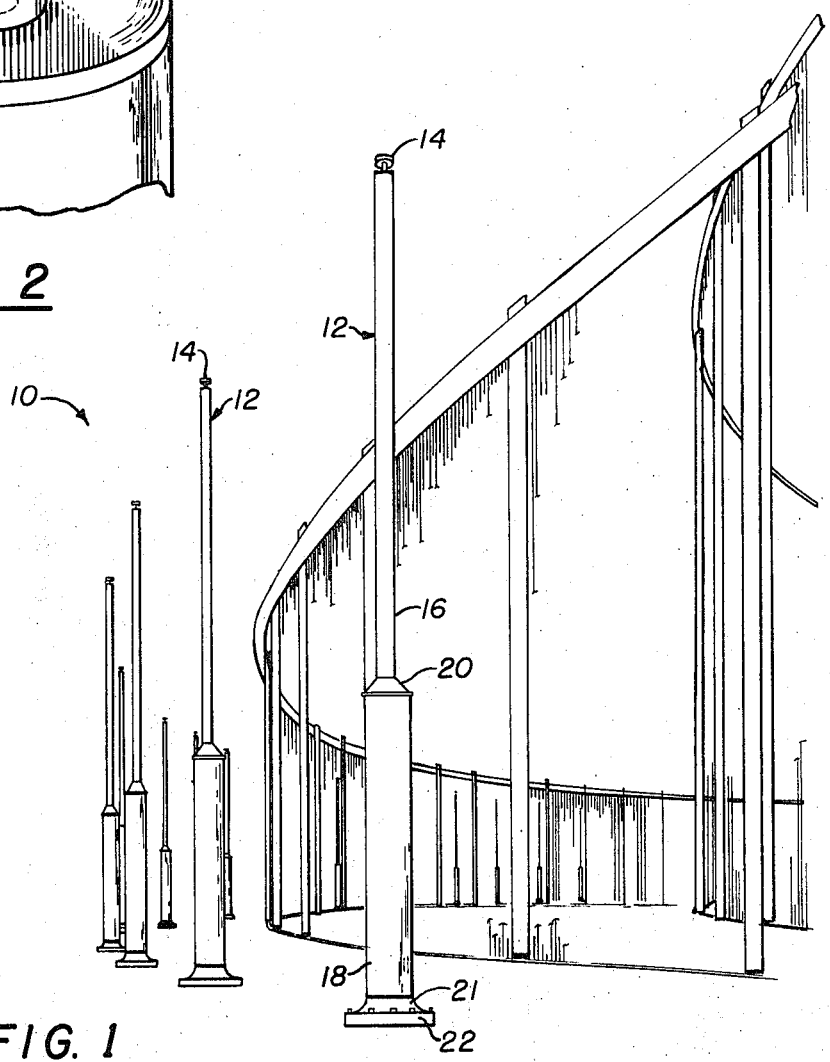
FIG. 1 is a partial perspective view of a Wullenweber antenna array showing a high band monopole antenna, being one installation on which the novel vibration damper may be installed.

Referring to the drawing where like reference numerals refer to similar parts there is partially shown in FIG. 1, a Wullenweber antenna array 10 utilizing a high band monopole antenna 12, which is only one example of a slender vertical structure on which the novel vibration damper 14 of this invention can be employed.

Monopole antenna 12 is approximately 22 feet in height and is constructed essentially of aluminum being situated in an electromagnetic field. The antenna comprises an upper tubular element 16 of approximately 6 inches in diameter and a lower tubular element 18 of approximately 16 inches in diameter connected together by a fiber glass insulator 20. Element 18 is welded as its base to an aluminum flange 21 which is bolted to a concrete ground pad 22.

Tests on installed monopole antennas when subjected to normal wind conditions have disclosed that the upper element has an amplitude of vibration of one inch at the top with a corresponding amplitude of vibration of one-quarter of an inch at fiberglass insulator 20. This vibration has caused failure at the welded joint between the base of lower tubular element 18 and bolting flange 21.

Damper 14 has a "mushroom" configuration comprising an enlarged cap 24 and a flexible stem 26. Cap 24 is shown configured as a circular disk, although other shapes can be used, preferably symmetrical in design. Stem 26 is tubular to provide adequate support for the cap and to possess the necessary flexibility to permit the cap to rock back and forth from the antenna vibration. For this reason, the outer diameter of stem 26 should be a minor dimension with regard to the diameter of cap 24. The core opening 28 in the stem also provides a convenient manner of mounting the cap by receiving a central cap projection 30.

As the illustrated antenna is used in an electromagnetic field, cap 24 and stem 26 are preferably fabricated of rubber, such as ethylene propylene rubber, to avoid interference with reception of the radio signals. One such prototype that has proven satisfactory in use is constructed with a circular disk-shaped cap 6 inches in diameter and 2 inches thick, weighing 3 pounds. The stem is 4½ inches in length, having a 1⅝ inch outer diameter, a core diameter of ⅝ inch, and weighing approximately ½ pound. The cap is cemented to the stem, and the base of the stem is rubber cemented to the top of the monopole antenna, with special heavy rubber cement. Where the use of adhesive for the attachment means is not suitable, an adapter cap to fit over the top of the structure may be employed.

The above described installation was tested during a period where wind velocity varied between 6 to 12 knots, with an average around 10 knots. The greatest amplitude of vibration was noted at right angles to the wind direction, due to the Bernoullian principle. The following average readings were observed with a General Radio Type 1553A Vibration Meter pickup attached on two different antennas at a point 69 inches above the insulator. Due to the low frequency involved, the readings show relative rather than true amplitude, but they are sufficient to show the effectiveness of the dampers.

| Antenna | Average Reading | Peak Reading |
| --- | --- | --- |
| Undamped | 10.0 | 11.0 |
| Damped | 1.25 | 2 to 3 |

The peak readings on the damped antenna were of short duration as wind gusts hit the antenna and started the damper action. However, the undamped antenna showed little change in amplitude from a steady wind to gusty winds, dropping only with extremely low velocity.

The damper of this invention utilizes the unique technique of detuning the antenna rather than relying on heavy brute-force means. This is an important consideration as a heavy damper on top of the slender antenna could, due to its inertia, cause destruction of the antenna during an earthquake or by heavy wind gusts. However, the invention damper is of sufficient lightweight as to not interfere with the free movement of the antenna during such events. The invention damper is simple to install on top of the antenna without requiring reconstruction of the antenna. The rubber stem need only be rubber cemented to the top of the antenna. To reinforce the attachment, a bead of epoxy rubber can be placed around the base of the stem where it contacts the antenna top. For unusual structures, some type of adapter cap, preferably of rubber, may be required.

Since the damper does not contain relative moving parts it is unlikely to require any maintenance, which is a factor considering that the top of the antenna is not a readily accessible location.

Obviously many modifications and variations of the present invention are possible in the light of the above teachings. It is therefore to be understood that within the scope of the appended claims the invention may be practiced otherwise than as specifically described.

What is claimed is:

1. The combination of a slender, vertically base-supported structure subject to vibration and a damper for cancelling said vibration comprising:
   a damper mass;
   a vertical central stem member connected to said damper mass and supporting said damper mass to and in spaced relation on the top of said vertical base-supported structure;
   means securing said stem to the structure;
   said stem being flexible and having a narrow cross-sectional dimension as compared to said damper mass forming a mushroom-like configuration;
   whereby said damper mass is capable of oscillating in a rocking motion to lag the vibration and detune the structure.

2. The combination of a monopole antenna and a mushroom-shaped damper for cancelling the vibration to which the antenna is subjected, said damper comprising:
   a plate-like damper cap having a symmetrical and uniform cross-sectional configuration;
   a central vertical stem of resilient material supporting said cap to and in spaced relation to the top of said antenna;
   means securing said stem to the antenna;
   said cap and stem being fabricated of non-metallic material;
   the cross-sectional area of the stem being a minor portion of the cross-sectional area of the cap;
   whereby said cap is capable of oscillating in a rocking motion to lag the vibration and detune the antenna.

3. The combination of a slender, vertical base-supported structure subjected to vibration and a damper for cancelling said vibration comprising:
   a damper mass;
   a vertical central stem member connected to said damper mass and supporting said damper mass to and in spaced relation on the top of said vertical base-supported structure;
   said stem being flexible and having a narrow cross-sectional dimension as compared to said damper mass;
   said stem being tubular, and said damper mass having a projection fitting into the tubular end of the stem;
   whereby said damper mass is capable of oscillating in a rocking motion to lag the vibration and detune the structure.

* * * * *